United States Patent
Szini et al.

(10) Patent No.: US 11,152,970 B1
(45) Date of Patent: Oct. 19, 2021

(54) DIELECTRIC-LOADING DETECTION APPARATUS

(71) Applicant: Apple Inc., Cupertino, CA (US)

(72) Inventors: Istvan J. Szini, San Jose, CA (US); Jim C. Hwang, Danville, CA (US); Yoav Feinmesser, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/028,879

(22) Filed: Sep. 22, 2020

(51) Int. Cl.
*H04B 1/44* (2006.01)
*H04B 1/3827* (2015.01)

(52) U.S. Cl.
CPC ............... *H04B 1/44* (2013.01); *H04B 1/385* (2013.01)

(58) Field of Classification Search
CPC .................................. H04B 1/44; H04B 1/385
See application file for complete search history.

(56) References Cited

U.S. PATENT DOCUMENTS

| | | | | |
|---|---|---|---|---|
| 10,075,206 | B1* | 9/2018 | Erentok | G06F 1/163 |
| 2013/0225100 | A1* | 8/2013 | Chen | H04B 15/00 |
| | | | | 455/78 |
| 2014/0009203 | A1* | 1/2014 | Cebi | H03K 17/6871 |
| | | | | 327/379 |
| 2014/0011463 | A1* | 1/2014 | Madan | H03K 17/687 |
| | | | | 455/78 |
| 2017/0141759 | A1* | 5/2017 | Srirattana | H03H 11/04 |
| 2020/0411969 | A1* | 12/2020 | Wang | H01Q 1/273 |

* cited by examiner

*Primary Examiner* — David Bilodeau
(74) *Attorney, Agent, or Firm* — Morgan, Lewis & Bockius LLP (57) ABSTRACT

An apparatus for detecting worn and/or unworn status of a wearable host device includes one or more first antennas, a second antenna, and a radio-frequency (RF) circuit to measure a dielectric loading based on an RF isolation. The second antenna is placed within a portion of the wearable host device that is substantially in contact with the skin of a user, and the RF isolation is between at least one of the one or more first antennas and the second antenna.

20 Claims, 8 Drawing Sheets

DIELECTRIC-LOADING DETECTION APPARATUS

TECHNICAL FIELD

The present description relates generally to wireless technology, and more particularly to a dielectric-loading detection apparatus.

BACKGROUND

Automatically locking a smartphone or smartwatch is a security feature that also helps with battery-charge saving. A smartwatch, for example, may automatically lock as the user removes the watch from the wrist to disallow someone else to access the watch. The locked watch can be unlocked manually by entering a password or by unlocking a smartphone linked to the smartwatch. A smartwatch, however, may lock automatically even when worn by the user if it is worn loosely. Currently, smartwatch manufacturers have adopted the use of optical sensors to detect a watch off-wrist event.

One shortcoming of optical sensing is that any material that reflects light can cause the watch to miss removals. The reflected light can mislead the optical-detection mechanism to believe that that the watch is on the user's wrist when it is not. This can be a serious security issue, allowing the watch to remain unlocked even after being removed from the user's wrist.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to a dielectric-loading detection apparatus. The apparatus of the subject technology is based on a technique for wireless detection of on- and/or off-wrist detection for a watch (e.g., a smartwatch) using the dielectric-loading change due to removing the watch from the wrist of its user. The disclosed technology integrates a dedicated antenna into the watch in a region that is in contact or in close proximity to the user's wrist (e.g., a body-contact dome of the watch). This dedicated antenna is an addition to the already existing watch antennas, such as the band antennas for cellular bands, global positioning system (GPS), Bluetooth and/or wireless local-area network (WLAN). The fundamental concept behind the disclosed technology is based on a change in the antenna complex impedance and radiation performance between free space (off-wrist) and while in proximity to the user's wrist up to a specific distance (e.g., within a range of 0 mm to 10 mm) away from the wrist.

Wrist detection can be implemented through a combination of embodiments. In one or more aspects, analogous to a vector network analyzer S11 parameter measurement, the difference in reflected power from the dedicated antenna between free space and wrist is quantified and used for watch on- and/or off-wrist detection. In some aspects, analogous to vector network analyzer S21, S22 ... S2n parameter measurements, the difference in radio-frequency (RF) coupling (isolation) between two or more antennas, such as the dedicated antenna and any other peripheral antennas on the device, at free space and on-wrist is quantified and used for watch on- and/or off-wrist detection. In some aspects, the disclosed solution uses an algorithm to combine both S11 and S21 ... S2n measurements to detect dielectric loading, minimizing detection time and current drain. The subject technology is leveraging analysis of RF reflections between two (or more) antennas of a wireless communication device such as Wi-Fi to implement a simple proximity detector. The disclosed technology can be used in a number of applications, including wireless moisture (e.g., water or sweat) detection applications and potential health-related detection applications such as watch-user dehydration detection.

Figure 1:
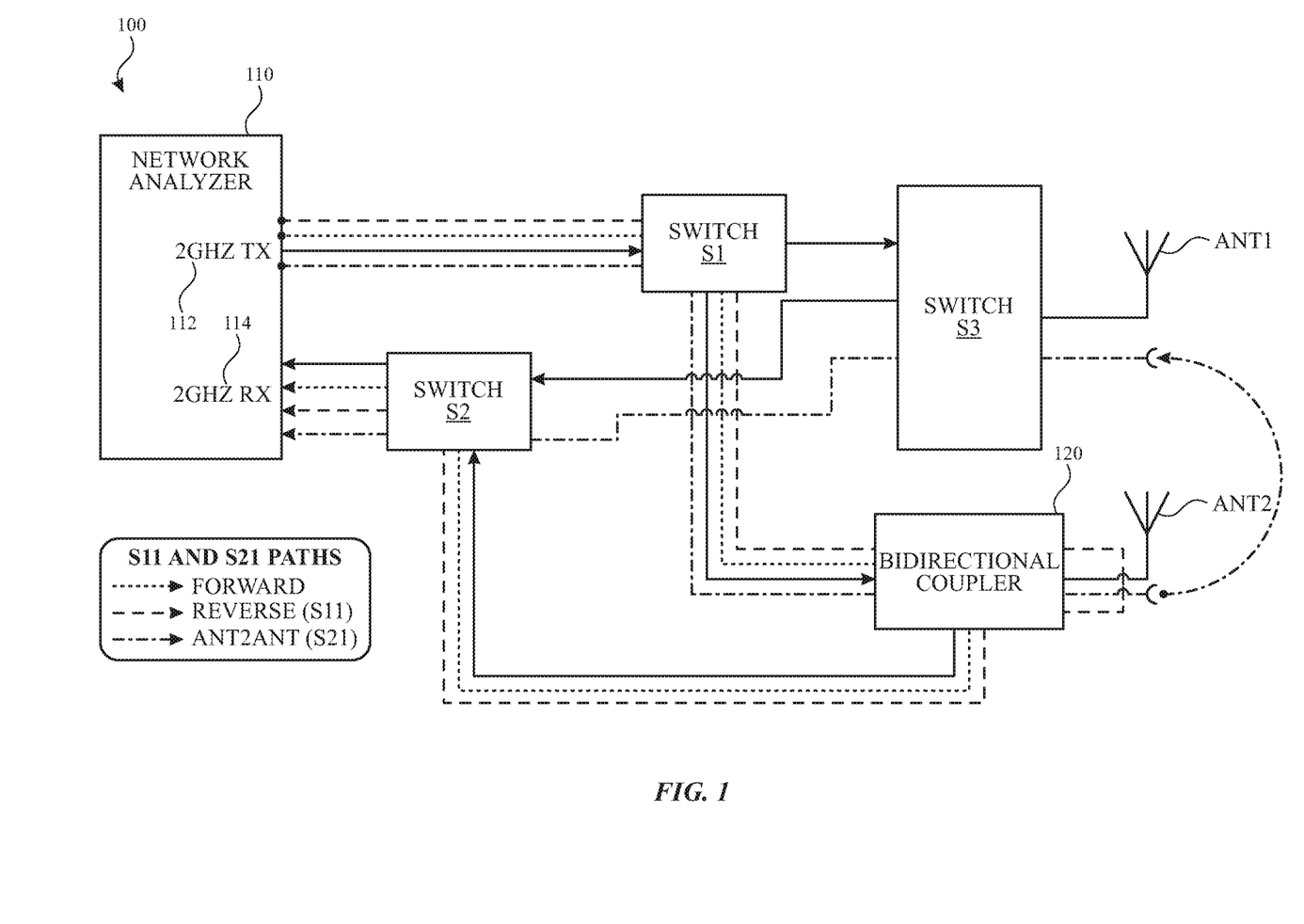
FIG. 1 is a schematic diagram illustrating an example of a dielectric-loading detection apparatus, in accordance with one or more aspects of the subject technology.

FIG. 1 is a schematic diagram illustrating an example of a dielectric-loading detection apparatus 100, in accordance with one or more aspects of the subject technology. The dielectric-loading detection apparatus 100 (hereinafter, apparatus 100) can be incorporated in the watch for on- and/or off-wrist detection of the watch by measuring parameters S11 and S21, as discussed herein. The apparatus 100 includes an RF circuit such as a network analyzer 110, a first switch S1, a second switch S2, a third switch S3, a coupler 120, a first antenna Ant1 and a second antenna Ant2. In one or more implementations, the first switch S1 and the second switch S2 can be single-pole double-throw (SPDT)

switches, and the third switch S3 is a single-pole four-throw (SP4T) switch. In one or more implementations, the coupler 120 can be a bidirectional coupler. The first antenna Ant1 is a band antenna (e.g., for cellular bands, GPS, Bluetooth and/or WLAN) and the second antenna Ant2 is dedicated antenna used exclusively for dielectric-loading detection of the subject technology.

The network analyzer 110 can be implemented in hardware (HW), for example, in an application-specific integrated circuit (ASIC), or partially in firmware or software (SW) executed by a processor of the watch. The network analyzer 110 has a transmit (Tx) port 112 and a receive (Rx) port 114 and is capable of transmitting a Tx signal and receiving and analyzing an Rx signal. In some implementations, the Tx and Rx signals can be at any frequency, for example, at 2.42 GHz. The first switch S1 can receive the Tx signal from the Tx port 112 and selectively forward the Tx signal to either the third switch S3 or the coupler 120. The second switch S2 can receive return signals from the third switch S3 and the coupler 120 and selectively forward the return signals to the Rx port 114. The first antenna Ant1 is coupled to the third switch S3 and the second antenna Ant2 is coupled to the coupler 120. The network analyzer 110 can measure the parameter S11 of the second antenna Ant2 by transmitting a first Tx signal through the first switch S1 and the coupler 120 to the second antenna Ant2 and analyze a first return signal from the second antenna Ant2.

Further, the network analyzer 110 can measure the parameter S21, which represents the RF coupling (isolation) between the first antenna Ant1 and the second antenna Ant2, by transmitting a second Tx signal through the first switch S1 and the coupler 120 to the second antenna Ant2 and analyze a second return signal from the first antenna Ant1 through the third switch S3 and the second switch S2. The network analyzer 110 can also send a forward signal through the first switch S1 to the coupler 120 and receive and analyze the forward signal from the coupler 120 through the second switch S2. The forward signal can be used as a reference signal that has traveled the same path as the first and second Tx signals when measuring the S11 and S21 parameters.

The measured parameter S11 or S21 can be equally adopted to detect whether the user is wearing the watch, as these parameters are sensitive to the dielectric loading between the watch dome and the body (S11) or between the first antenna Ant1 and second antenna Ant2 (S21), which is controlled by the medium, which can be air, sweat or water. For example, when the watch is loosely worn, that medium can be air or sweat; when the wrist is wet, the medium can be water; and when the watch is off the wrist, the medium can be air. A processor of the watch can use the result of the S11 and S21 measurement to determine whether the watch is on or off the wrist and, based on the determination, decide whether to lock or not lock the watch.

Figure 2:
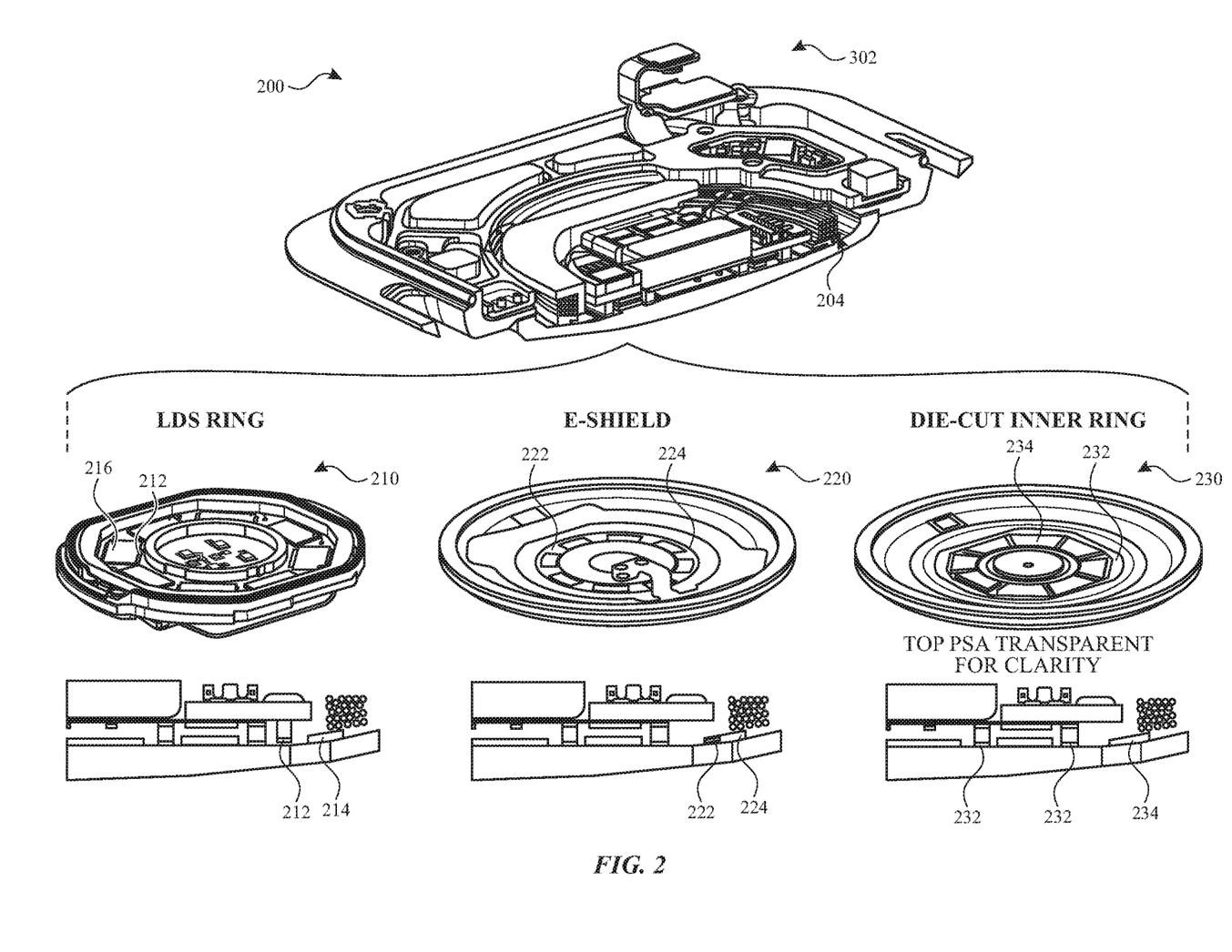
FIG. 2 is a diagram illustrating examples of different placement options for a dielectric-loading detection dedicated antenna in a watch dome, in accordance with one or more aspects of the subject technology.

FIG. 2 is a diagram illustrating examples of different placement options for a dielectric-loading detection dedicated antenna in a watch dome 200, in accordance with one or more aspects of the subject technology. The watch dome 200 includes an electromagnetic shield (E-shield) 204, and the options for placement of the dielectric-loading detection dedicated antenna (hereinafter, dedicated antenna) include, but are not limited to, a first option 210, a second option 220 and a third option 230. In the first option 210 the dedicated antenna 212 is placed in the LDS ring and below a plastic part 216 and at a distance from the E-shield 214. In the second option 220 the dedicated antenna 222 is integrated with the E-shield 224. In the third option 230 the dedicated antenna 232 is placed in the die-cut inner ring and adjacent to the E-shield 234.

Figure 3:
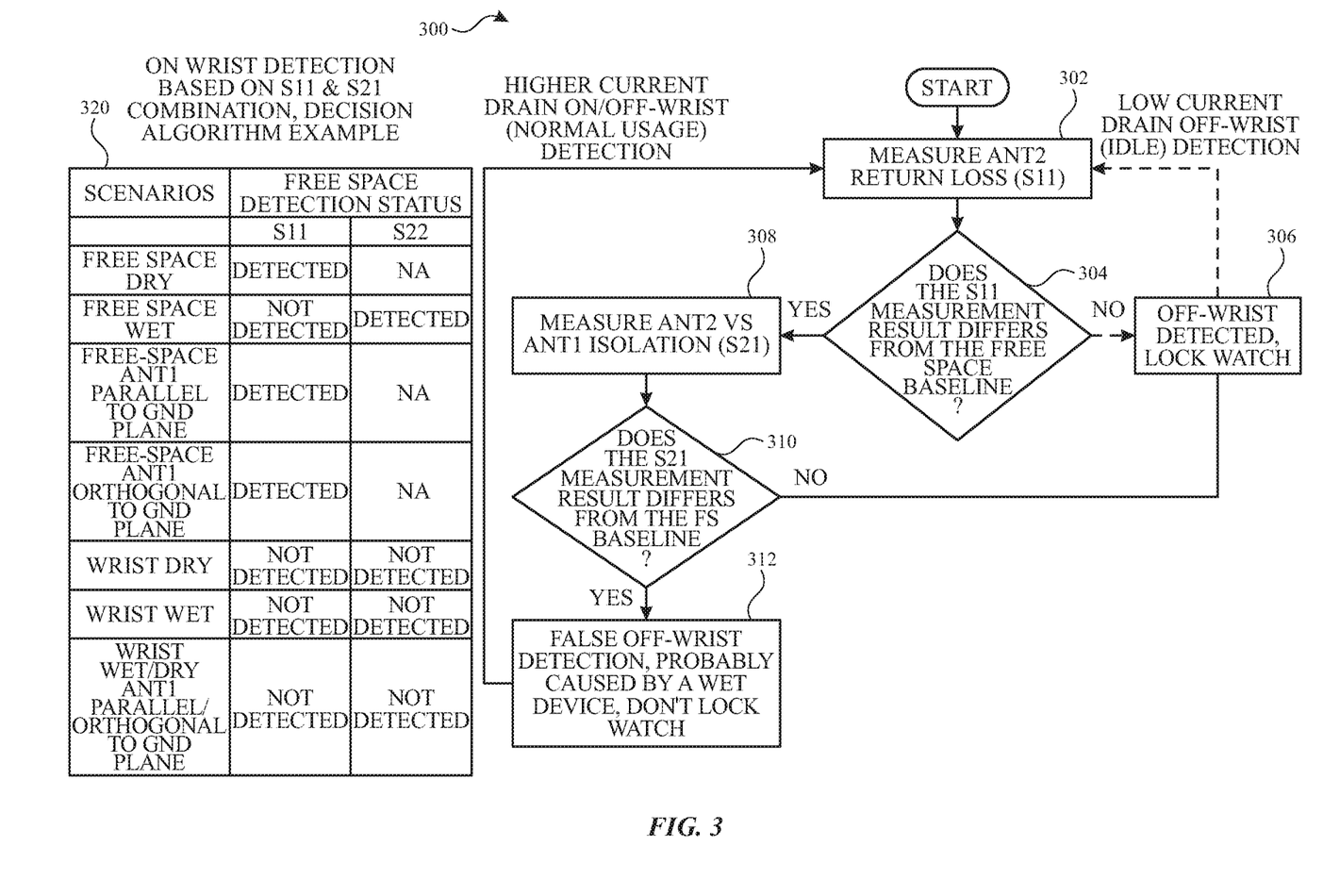
FIG. 3 is a flow diagram illustrating an example of a process for dielectric-loading detection, in accordance with one or more aspects of the subject technology.

FIG. 3 is a flow diagram illustrating an example of a process 300 for dielectric-loading detection, in accordance with one or more aspects of the subject technology. The process 300 starts at operation block 302, where the network analyzer 110 of FIG. 1 measures the return loss (S11) of the second antenna Ant2, as discussed above. At control operation block 304, it is determined whether the measured return-loss value differs from the free-space baseline return-loss value. The free-space baseline return-loss value is measured while the watch is off the user's wrist. If the measured return-loss value does not differ from the free-space baseline return-loss value at operation block 306, the off-wrist status is detected and the watch is locked (e.g., by a processor of the watch). The measurement of the return loss (S11) of the second antenna Ant2 consumes less power from the watch battery and is the preferred mode for off-wrist detection, and that is the reason for the process 300 starting with the S11 measurement. If the measured return-loss value differs from the free-space baseline return-loss value at operation block 308, the network analyzer measures the RF isolation (S21) between the first antenna Ant1 and the second antenna Ant2 of FIG. 1. At control operation block 310, the processor determines whether the measured S21 value differs from the free-space baseline RF isolation value. If the measured S21 value does not differ from the free-space baseline RF isolation value, the control is passed to the operation block 306 and the watch is locked by the processor. If the measured S21 value differs from the free-space baseline RF isolation value at operation block 312, false off-wrist detection is detected, the watch is not locked and the control is passed to the operation block 302. The false off-wrist detection can be caused, for example, by a wet watch.

The table 320 shows an example on-wrist detection-decision algorithm based on the combined S11 and S21 measurements. The first column shows various scenarios including free-space dry, free-space wet, free-space first antenna Ant1 parallel to the ground (GND) plane, wrist dry, wrist wet and/or dry and first antenna Ant1 parallel and/or orthogonal to the GND plane. The second and third columns show free-space detection status for S11 and S21 measurements, respectively. As indicated in the table 320, the on-wrist status can be detected by the less-power consumption S11 measurement only in free-space dry, free-space Ant1 parallel and/or orthogonal to the GND plane scenarios. In the free-space wet scenario, the S11 measurement cannot detect on-wrist status and only S22 measurement works. So, for wet scenarios, the higher-power consumption S21 measurement can be used to detect on-wrist status.

Figure 4:
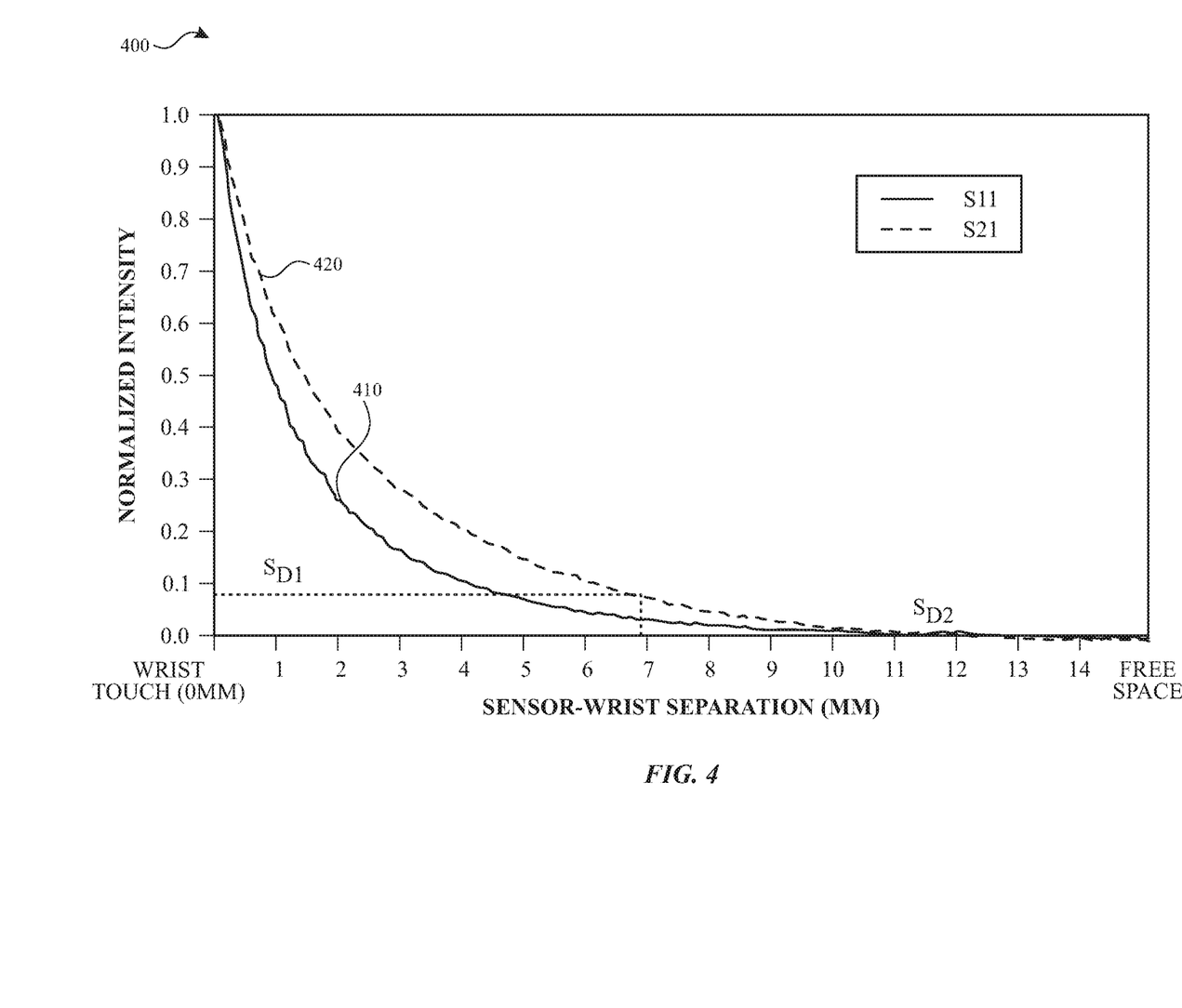
FIG. 4 is a chart illustrating example plots of wrist-sensor proximity curves for an example dielectric-loading detection apparatus, in accordance with one or more aspects of the subject technology.

FIG. 4 is a chart 400 illustrating example plots 410 and 420 of wrist-sensor proximity for an example dielectric-loading detection apparatus, in accordance with one or more aspects of the subject technology. The plots 410 and 420 show normalized intensity versus sensor-wrist separation (mm) resulting from the S11 and S21 measurements, respectively. Based on plots 410 and 420, both S11 and S21 measurement can be equally adopted for off-wrist detection of the watch from the sensor-wrist distance of 0 mm (watch dome touching the wrist) to 10 mm. The S11 measurement, however, is not sufficient for wet situations, as described above and explained with further charts herein.

Figure 5:
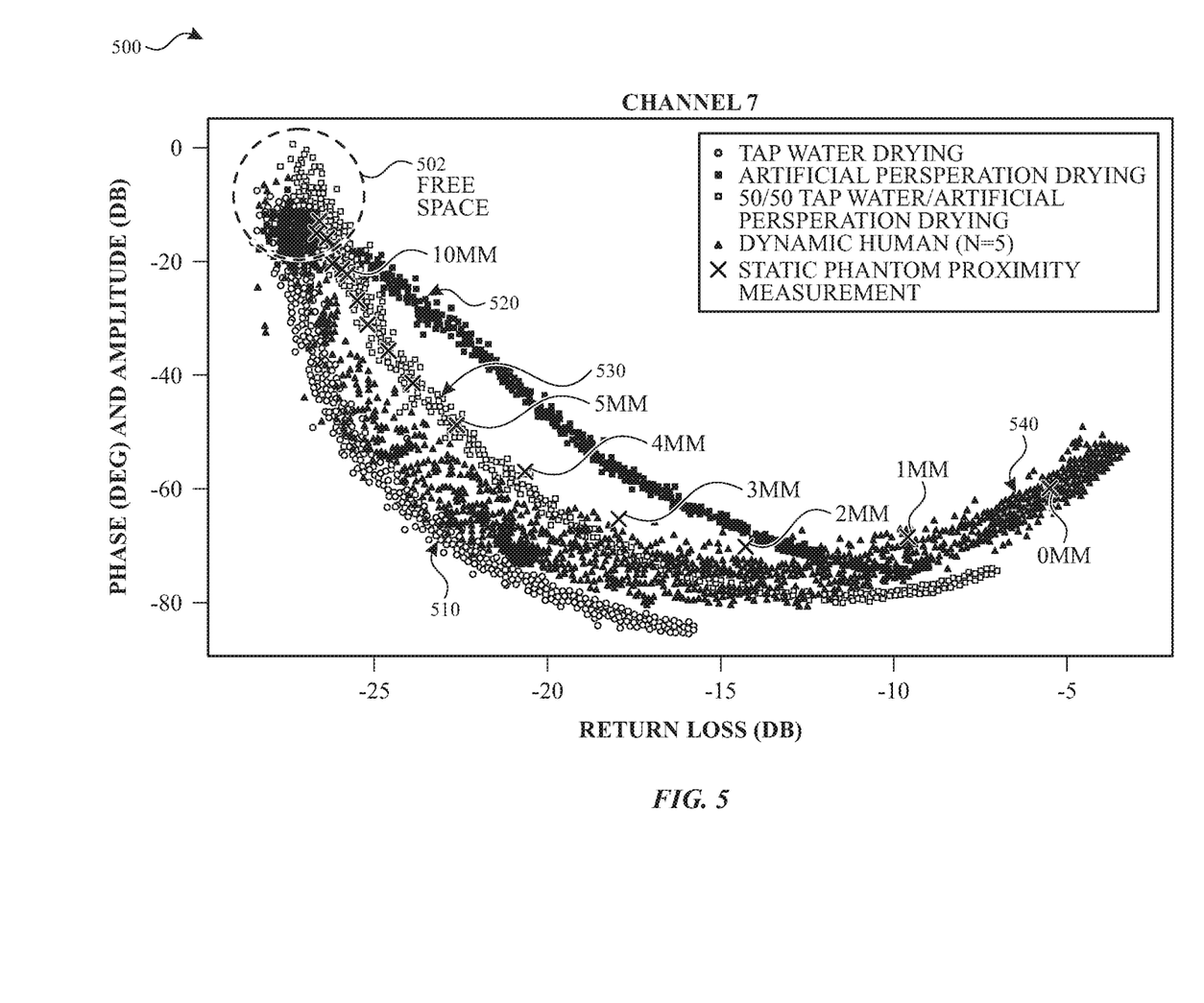
FIG. 5 is a chart illustrating example plots of phase versus return-loss measurement results for an example of a watch with an integrated dielectric-loading detection apparatus, in accordance with one or more aspects of the subject technology.

FIG. 5 is a chart 500 illustrating example plots 510, 520, 530 and 540 of phase versus return-loss measurement results for an example of a watch with an integrated dielectric-loading detection apparatus, in accordance with one or more aspects of the subject technology. The variation of magnitude and phase of the impedance versus return loss (S11) of the second antenna Ant 2 as shown by each of the plots 510, 520, 530 and 540 is the result of drying of the drop of liquid (tap water, artificial perspiration or a combination of both) on the watch dome where the second antenna Ant2 is located. The plots 510, 520, 530 and 540 correspond to a drop of tap water, artificial perspiration, a 50/50 combination of water and artificial perspiration and a dynamic human, respectively. The dynamic human plot 530 depicts the situation where the distance between the watch dome and the human wrist is changed.

The data point indicated by the crosses corresponds to the sensor (watch dome) being at various distances (0 mm, 1 mm, 2 mm, 3 mm, 4 mm, 5 mm and 10 mm) from a static phantom. The data within the circle 502 correspond to dry free space. The return loss decreases and the phase increases as the liquid dries. When the watch is dry in free space, all the plots, as expected, merge. The data in the plots 510, 520, 530 and 540 indicate that the S1 measurement is not sufficient to detect on- and/or off-wrist detection of the watch when the watch dome is wet and the S21 measurement, as described above, complements the S11 measurement in wet scenarios.

Figure 6A:
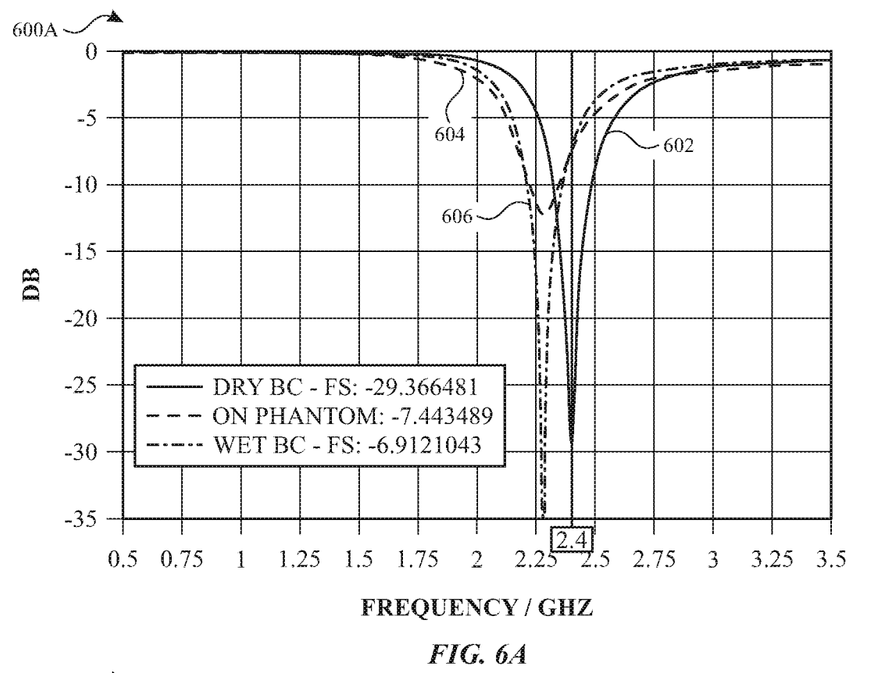
FIGS. 6A and 6B are charts illustrating example plots of S11 and S21 parameters of a dielectric-loading detection dedicated antenna and a band antenna of a watch, respectively, in accordance with one or more aspects of the subject technology.
Figure 6B:
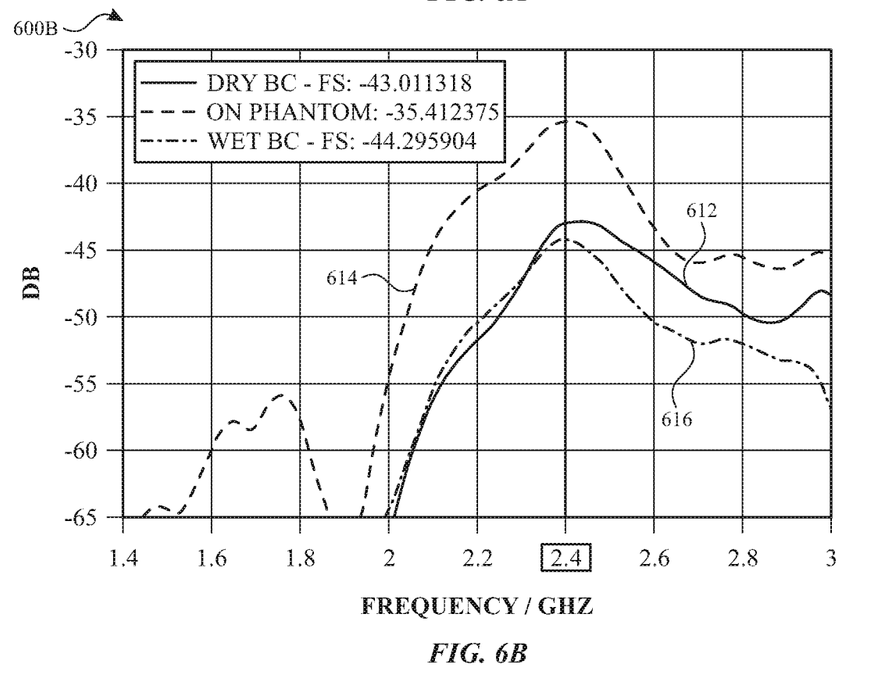

FIGS. 6A and 6B are charts 600A and 600B illustrating example plots 602, 604 and 606 of S11 parameter and plots 612, 614 and 616 of S21 parameter of a dedicated antenna and a band antenna of a watch, respectively, in accordance with one or more aspects of the subject technology. The plots 602, 604 and 606 correspond to a scenario where the antennas Ant1 and Ant2 are matched at a frequency of 2.4 GHz. The plot 602 is for dry antennas Ant1 and Ant2, for which a return loss (S11) of about −29.4 dB is measured at the matched frequency of 2.4 GHz. The plot 604 is for the watch being on a phantom, and the S11 measurement shows a return loss of about 7.4 dB for the matched frequency. The plot 606 is for wet antennas Ant1 and Ant2, for which a return loss (S11) of about −6.9 dB is measured at the matched frequency of 2.4 GHz, which is very close to the value of −7.4 dB for the plot 604. This indicates that the S11 measurement may not be a suitable measurement to distinguish between the watch being on a phantom and the dome of the watch being wet.

The plots 612, 614 and 616 again correspond to a scenario where the antennas Ant1 and Ant2 are matched at a frequency of 2.4 GHz. The plot 612 is for dry antennas Ant1 and Ant2, for which an isolation (S21) of about −43 dB is measured at the matched frequency of 2.4 GHz. The plot 614 is for the watch being on the phantom, and the S21 measurement shows an isolation of about −35.4 dB for the matched frequency. The plot 616 is for wet antennas Ant1 and Ant2, for which an isolation (S21) of about −44.3 dB is measured at the matched frequency of 2.4 GHz. These results indicate that the S21 measurement can be a suitable measurement to distinguish between the watch being on a phantom and the dome of the watch being wet, and it can prevent false unlocks that can lead to compromising the security of the watch.

Figure 7:
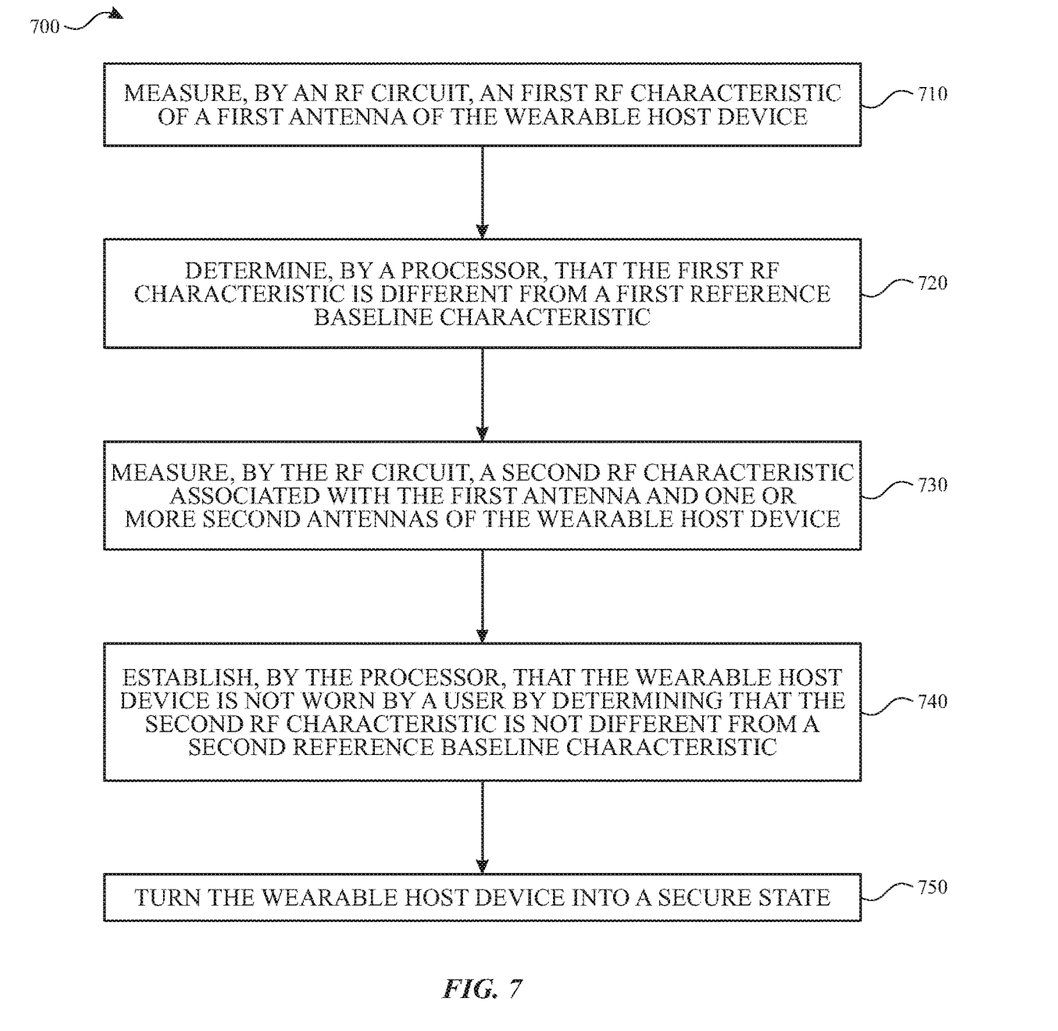
FIG. 7 is a flow diagram illustrating an example of a method for dielectric-loading detection, in accordance with one or more aspects of the subject technology.

FIG. 7 is a flow diagram illustrating an example of a method 700 for dielectric-loading detection, in accordance with one or more aspects of the subject technology. The method 700 includes measuring, by an RF circuit, a first RF characteristic of a first antenna of the wearable host device (710). The method 700 further includes determining, by a processor, that the first RF characteristic is different from a first reference baseline characteristic (720). The method 700 also includes measuring, by the RF circuit, a second RF characteristic associated with the first antenna and one or more second antennas of the wearable host device (730). The method 700 further includes establishing, by the processor, that the wearable host device is not worn by a user by determining that the second RF characteristic is not different from a second reference baseline characteristic (740), and turning the wearable host device into a secure state (750).

Figure 8:
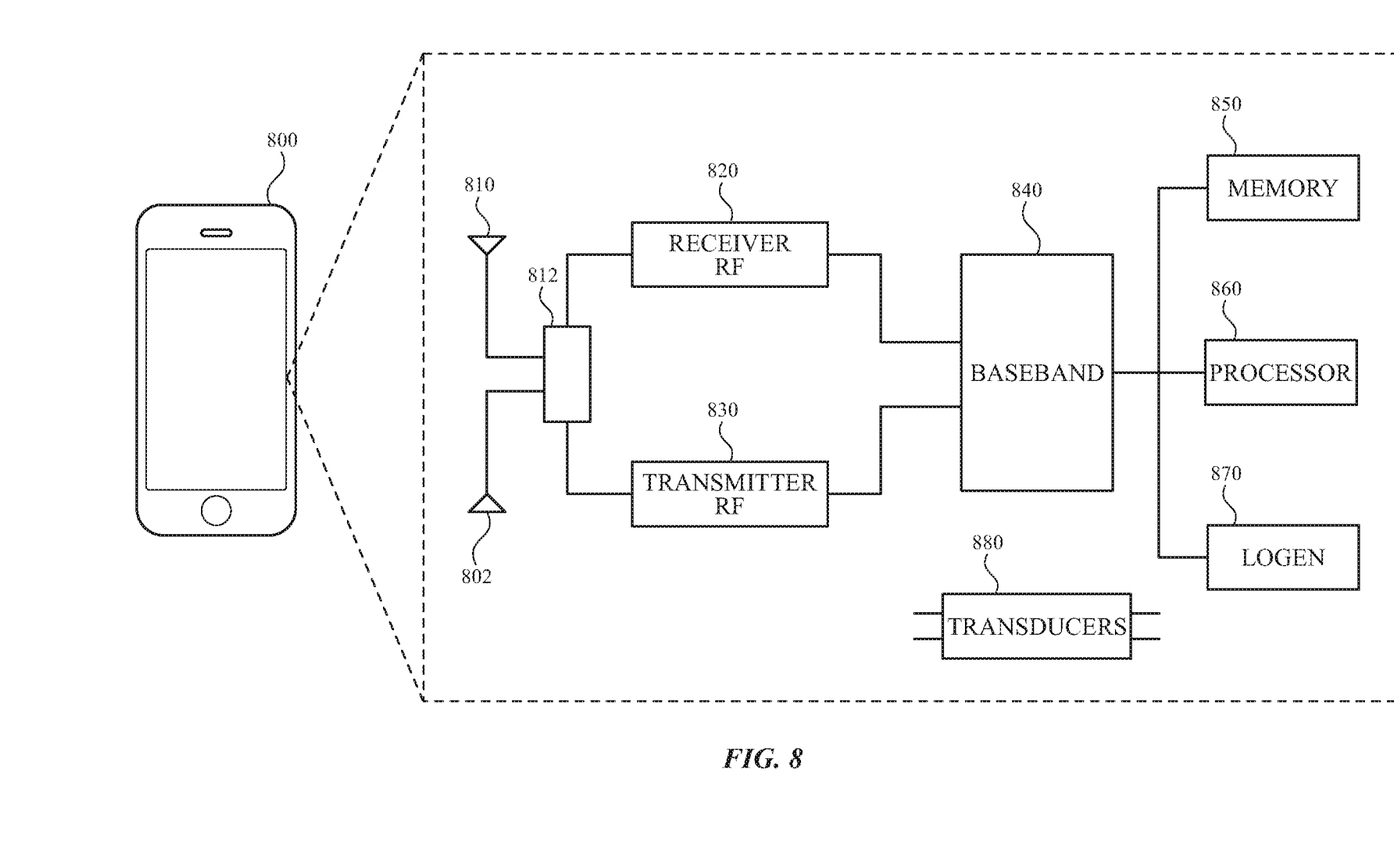
FIG. 8 is a block diagram illustrating an example wireless communication device, within which the dielectric-loading detection apparatus of the subject technology can be integrated.

FIG. 8 is a block diagram illustrating an example wireless communication device 800, within which the dielectric-loading detection apparatus of the subject technology can be integrated. In one or more implementations, the wireless communication device 800 can be a wearable communication device such as a watch or any other wearable electronic device. The wireless communication device 800 may comprise a dedicated antenna 802, a radio-frequency (RF) antenna 810, a receiver 820, a transmitter 830, a baseband processing module 840, a memory 850, a processor 860, a local oscillator generator (LOGEN) 870 and one or more transducers 880. In various embodiments of the subject technology, one or more of the blocks represented in FIG. 8 may be integrated on one or more semiconductor substrates. For example, the blocks 820-870 may be realized in a single chip or a single system on a chip, or may be realized in a multichip chipset.

The dedicated antenna is used for the dielectric-loading detection and is placed in a portion of the wireless communication device 800 that is in contact with the skin of the user of the wireless communication device 800 (e.g., a dome of a watch). The RF antenna 810 may be a GPS antenna, a Bluetooth antenna, a WLAN antenna or any other RF antenna.

The receiver 820 may comprise suitable logic circuitry and/or code that may be operable to receive and process signals from the RF antenna 810. The receiver 820 may, for example, be operable to amplify and/or down-convert received wireless signals. In various embodiments of the subject technology, the receiver 820 may be operable to cancel noise in received signals and may be linear over a wide range of frequencies. In this manner, the receiver 820 may be suitable for receiving signals in accordance with a variety of wireless standards, Wi-Fi, WiMAX, Bluetooth, and various cellular standards. In various embodiments of the subject technology, the receiver 820 may not require any SAW filters and few or no off-chip discrete components such as large capacitors and inductors.

In one or more implementations, the receiver 820 may be used to implement at least some of the features of a network analyzer 110 of FIG. 1, including receiving signals from the dedicated antenna 802 and the RF antenna 810, as discussed above.

The transmitter 830 may comprise suitable logic circuitry and/or code that may be operable to process and transmit signals from the RF antenna 810. The transmitter 830 may, for example, be operable to up-convert baseband signals to RF signals and amplify RF signals. In various embodiments of the subject technology, the transmitter 830 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 830 may be operable to provide signals for further amplification by one or more power amplifiers.

In one or more implementations, the transmitter 830 may be used to implement at least some of the features of a network analyzer 110 of FIG. 1, including transmitting signals to the dedicated antenna 802 and the RF antenna 810, as discussed above.

The duplexer 812 may provide isolation in the transmit band to avoid saturation of the receiver 820 or damaging parts of the receiver 820, and to relax one or more design requirements of the receiver 820. Furthermore, the duplexer 812 may attenuate the noise in the receive band. The duplexer may be operable in multiple frequency bands of various wireless standards.

The baseband processing module 840 may comprise suitable logic, circuitry, interfaces, and/or code that may be operable to perform processing of baseband signals. The baseband processing module 840 may, for example, analyze received signals and generate control and/or feedback signals for configuring various components of the wireless communication device 800, such as the receiver 820. The baseband processing module 840 may be operable to encode, decode, transcode, modulate, demodulate, encrypt, decrypt, scramble, descramble, and/or otherwise process data in accordance with one or more wireless standards.

The processor 860 may comprise suitable logic, circuitry, and/or code that may enable processing data and/or controlling operations of the wireless communication device 800. In this regard, the processor 860 may be enabled to provide control signals to various other portions of the wireless communication device 800. The processor 860 may also control transfers of data between various portions of the wireless communication device 800. Additionally, the processor 860 may enable implementation of an operating system or otherwise execute code to manage operations of the wireless communication device 800.

In one or more aspects, the processor 860 may be used to implement some features of the subject technology, for example, to execute one or more steps of the process 300 of FIG. 3 and/or the method 700 of FIG. 7.

The memory 850 may comprise suitable logic, circuitry, and/or code that may enable storage of various types of information such as received data, generated data, code, and/or configuration information. The memory 850 may comprise, for example, RAM, ROM, flash, and/or magnetic storage. In various embodiments of the subject technology, information stored in the memory 850 may be utilized for configuring the receiver 820 and/or the baseband processing module 840.

The local oscillator generator (LOGEN) 870 may comprise suitable logic, circuitry, interfaces, and/or code that may be operable to generate one or more oscillating signals of one or more frequencies. The LOGEN 870 may be operable to generate digital and/or analog signals. In this manner, the LOGEN 870 may be operable to generate one or more clock signals and/or sinusoidal signals. Characteristics of the oscillating signals, such as the frequency and duty cycle, may be determined based on one or more control signals from, for example, the processor 860 and/or the baseband processing module 840.

In operation, the processor 860 may configure the various components of the wireless communication device 800 based on a wireless standard according to which it is desired to receive signals. Wireless signals may be received via the RF antenna 810, amplified, and down-converted by the receiver 820. The baseband processing module 840 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 850, and/or information affecting and/or enabling operation of the wireless communication device 800. The baseband processing module 840 may modulate, encode, and perform other processing on audio, video, and/or control signals to be transmitted by the transmitter 830 in accordance with various wireless standards.

The one or more transducers 880 may include a pressure sensor, an environmental sensor or other sensors.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neutral genders (e.g., hers and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to a configuration may apply to all configurations, or one or more configurations. A phrase such as "a configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

What is claimed is:

1. An apparatus for detecting worn and/or unworn status of a wearable host device, the apparatus comprising:
   one or more first antennas;
   a second antenna; and
   a radio-frequency (RF) circuit configured to measure a dielectric loading based on an RF isolation,
   wherein:
   the second antenna is placed within a portion of the wearable host device that is substantially in contact or in close proximity with a skin of a user, and
   the RF isolation is between at least one of the one or more first antennas and the second antenna.

2. The apparatus of claim 1, wherein the wearable host device comprises a watch and wherein the portion of the wearable host device comprises a dome of the watch.

3. The apparatus of claim 1, wherein the RF circuit comprises a network analyzer circuit, implemented at least in one of hardware or firmware or partially in software, or is implemented using an existing RF system-on-chip (SoC) including a Wi-Fi or Bluetooth RF SoC, and wherein the RF circuit is further configured to measure a return loss of the second antenna.

4. The apparatus of claim 3, wherein a processor is configured to compare a value of the measured return loss of the second antenna with a reference value, wherein the processor is integrated with the wearable host device.

5. The apparatus of claim 4, wherein the reference value comprises a free-space return-loss baseline, and wherein the processor is further configured to establish that the wearable host device is not worn by a user and turn the wearable host device into a secure state when the value of the measured return loss of the second antenna is not different from a value of a free-space return-loss baseline of the second antenna.

6. The apparatus of claim 5, wherein the measured return loss of the second antenna is different from a value of a free-space return loss of the second antenna, and wherein the processor is further configured to compare a value of the measured RF isolation with a value of a free-space isolation baseline.

7. The apparatus of claim 6, wherein the processor is further configured to determine that the value of the measured RF isolation is not different from the value of the free-space isolation baseline, and wherein the processor is configured to establish that the wearable host device is not worn by a user and turn the wearable host device into a secure state.

8. The apparatus of claim 6, wherein the processor is further configured to determine that the value of the measured RF isolation is different from the value of the free-space isolation baseline, and wherein the processor is configured to establish that the wearable host device is worn and keep the wearable host device unlocked.

9. The apparatus of claim 1, wherein the one or more first antennas comprise at least one of a long-term evolution (LTE) antenna, a global positioning system (GPS) antenna, a Bluetooth antenna, an ultra-wideband (UWB) antenna or a wireless local-area network (WLAN) antenna.

10. The apparatus of claim 1, wherein the second antenna comprises a dedicated antenna incorporated into a dome of a watch and placed in a location including one of an LDS ring, an electromagnetic shield or a die-cut inner ring of the watch.

11. A method of detecting worn and/or unworn status of a wearable host device, the method comprising:
    measuring, by an RF circuit, a first RF characteristic of a first antenna of the wearable host device;
    determining, by a processor, that the first RF characteristic is different from a first reference baseline characteristic;
    measuring, by the RF circuit, a second RF characteristic associated with the first antenna and one or more second antennas of the wearable host device;
    establishing, by a processor, that the wearable host device is not worn by a user by determining that the second RF characteristic is not different from a second reference baseline characteristic; and
    turning the wearable host device into a secure state.

12. The method of claim 11, wherein the wearable host device comprises a watch, the first antenna comprises a dedicated antenna of the watch and the one or more second antennas comprise band antennas of the watch, including at least one of a GPS, a Bluetooth or a WLAN antenna.

13. The method of claim 11, wherein the first RF characteristic comprises a return loss of the first antenna and the first reference baseline characteristic comprises a free-space baseline return loss of the first antenna.

14. The method of claim 11, wherein the second RF characteristic comprises an isolation between the first antenna and at least one of the one or more second antennas and the second reference baseline characteristic comprises a free-space baseline isolation.

15. The method of claim 11, further comprising establishing, by the processor, that the wearable host device is worn by determining that the second RF characteristic is different from a second reference baseline characteristic.

16. The method of claim 11, wherein the first antenna is incorporated into a dome of a watch and is placed in a location including one of an LDS ring, an electromagnetic shield or a die-cut inner ring of the watch.

17. A wearable communication device, the device comprising:
    one or more first antennas;
    a second antenna;
    a processor; and
    an RF circuit coupled to the one or more first antennas, the second antenna and the processor,
    wherein:
    the RF circuit is configured to measure a dielectric loading based on an RF isolation,
    the processor is configured to detect worn and/or unworn status of the device based on data generated by the RF circuit, and
    the RF isolation is between at least one of the one or more first antennas and the second antenna.

18. The device of claim 17, wherein:
    the RF circuit is configured to measure a return loss of the second antenna; and
    the processor is configured to:
    compare a value of a measured return loss of the second antenna with a free-space return-loss baseline, and
    establish that the device is not worn and turn the device into a secure state when the value of the measured return loss of the second antenna is not different from a value of a free-space return loss.

19. The device of claim 17, wherein:
    the RF circuit is configured to measure the RF isolation; and
    the processor is configured to:
    compare a value of the measured RF isolation with a value of a free-space isolation baseline, and establish that the device is worn by a user of the device when the value of the measured RF isolation is different from the value of the free-space isolation baseline.

20. The device of claim 17, wherein:

the RF circuit is configured to measure the RF isolation; and the processor is configured to:
   compare a value of a RF isolation with a value of a free-space isolation baseline, and
   establish that the device is not worn by a user of the device when the value of the measured RF isolation is not different from the value of the free-space isolation baseline.

* * * * *